(12) United States Patent
Liu et al.

(10) Patent No.: US 10,128,947 B2
(45) Date of Patent: Nov. 13, 2018

(54) METHOD FOR OPTICAL DRIVING CHIP TO CONTROL LIGHT-EMITTING DEVICE, AND OPTICAL DRIVE CHIP THEREFOR

(71) Applicant: KUANG-CHI INTELLIGENT PHOTONIC TECHNOLOGY LTD., Shenzhen (CN)

(72) Inventors: Ruopeng Liu, Shenzhen (CN); Xudong Wang, Shenzhen (CN); Weicheng Xu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/449,983

(22) Filed: Mar. 5, 2017

(65) Prior Publication Data
US 2017/0180048 A1   Jun. 22, 2017

Related U.S. Application Data

(63) Continuation of application No. PCT/CN2015/086831, filed on Aug. 13, 2015.

(30) Foreign Application Priority Data

Sep. 5, 2014   (CN) .......................... 2014 1 0453263

(51) Int. Cl.
*H04B 10/116* (2013.01)

(52) U.S. Cl.
CPC .................. *H04B 10/116* (2013.01)

(58) Field of Classification Search
CPC .. G06K 7/10693; G06K 7/14; G06K 7/10564; H04B 10/116
USPC ........................................................ 398/118
See application file for complete search history.

(56) References Cited

U.S. PATENT DOCUMENTS 8,699,887 B1    4/2014  Rothenberg
9,755,741 B1 *  9/2017  Elwell .................. H04B 10/116
(Continued)

FOREIGN PATENT DOCUMENTS

CN   102640434 A   8/2012
CN   102694598 A   9/2012
(Continued)

OTHER PUBLICATIONS

English Machine Translation of CN103812556; Jan. 11, 2018; 13 pages.*
(Continued)

*Primary Examiner* — Don N Vo
(74) *Attorney, Agent, or Firm* — Perkins Coie LLP (57) ABSTRACT

This application discloses a method for an optical drive chip to control a light-emitting device and an optical drive chip thereof. A receiving unit of the optical drive chip obtains to-be-sent data, and transmits the to-be-sent data to an execution unit of the optical drive chip; and the execution unit converts the to-be-sent data into a drive signal according to a control parameter set, where the drive signal is used to control a light-emitting device to emit visible light. Because the optical drive chip converts the to-be-sent data into the drive signal according to the control parameter set so as to control the light-emitting device, rather than obtaining a single control parameter one by one to control the light-emitting device, no delay problem occurs in a process of controlling the light-emitting device by the optical drive chip. In addition, the to-be-sent data is encoded, which ensures data transmission reliability.

17 Claims, 4 Drawing Sheets

(56) References Cited

U.S. PATENT DOCUMENTS

| | | | |
|---|---|---|---|
| 2002/0036813 A1 | 3/2002 | Roberts et al. | |
| 2005/0163010 A1* | 7/2005 | Sasaki | G11B 20/1217 369/53.16 |
| 2007/0286609 A1* | 12/2007 | Ikram | H04B 10/564 398/197 |
| 2008/0215391 A1 | 9/2008 | Dowling et al. | |
| 2010/0183053 A1* | 7/2010 | Tran | H04L 5/0008 375/219 |

FOREIGN PATENT DOCUMENTS

| | | |
|---|---|---|
| CN | 103116846 A | 5/2013 |
| CN | 203027260 U | 6/2013 |
| CN | 103684594 A | 3/2014 |
| CN | 103795936 A | 5/2014 |
| CN | 103812556 A | 5/2014 |
| JP | 2010103851 A | 5/2010 |

OTHER PUBLICATIONS

Supplementary European Search Report dated May 14, 2018 for EP Patent Application No. EP 15838780.3.
Devendra J Varanva et al: "LED to LED communication with WDM concept for flash light of Mobile phones Visible Light Communication", (IJACSA) International Journal of Advanced Computer Science and Applications, vol. 4, Jan. 1, 2013 (Jan. 1, 2013), XP055471420, * the whole document*.

* cited by examiner

METHOD FOR OPTICAL DRIVING CHIP TO CONTROL LIGHT-EMITTING DEVICE, AND OPTICAL DRIVE CHIP THEREFOR

CROSS REFERENCE TO RELATED APPLICATIONS

This application is a continuation of PCT Application No. PCT/CN2015/086831 filed on Aug. 13, 2015, which claims priority to Chinese Patent Application No. 201410453263.8 dated on Sep. 5, 2014, both of which are incorporated by reference.

TECHNICAL FIELD

The present application relates to the field of visible light communications technologies, and in particular, to a method for an optical drive chip to control a light-emitting device, and an optical drive chip thereof.

BACKGROUND

A wireless light communications technology is also called visible light communication, which uses high frequency flash of an LED light source to communicate. Light represents 1, and absence of light represents 0, and a transmission rate in the visible light communication is up to 1000 Mbps. The wireless light communication performs data transmission by using visible light. Compared with a microwave technology, the wireless light communication has relatively rich spectrum resources, which is incomparable with general microwave communication and wireless communication. In addition, the visible light communication is compatible with any communication protocol and applicable to any environment. In terms of security, the visible light communication is free from theft of communication content. A wireless light communication device is flexible, portable, cost-efficient, and suitable for massive popularized application.

Technical Problem

In the prior art, a mobile terminal such as a mobile phone performs visible light communication by controlling flashing of an LED flash. Methods commonly used for controlling an LED flash include: 1. A main processor controls flashing of an LED flash by controlling a power supply management chip; 2. The main processor controls flashing of the LED flash by controlling a camera chip; 3. The main processor controls flashing of the LED flash by controlling an LED driving chip; and 4. The main processor controls flashing of the LED flash directly.

The control performed by the main processor on the flashing of the flash is executed at a single step. For example, to implement an action of turning on and an action of turning off the LED flash, the main processor needs to send an "on" command and an "off" command to the LED flash separately. Because the work of the main processor is multi-thread work, according to task priorities, after the main processor sends the first command "on", the second command "off" tends to be sent at a delay, for example, when interruption occurs between the first command and the second command.

TECHNICAL SOLUTION

In view of a delay problem that occurs in a process of controlling a flash by a mobile terminal such as a mobile phone, this application provides a method for an optical drive chip to control a light-emitting device and an optical drive chip thereof.

According to a first aspect of this application, this application provides a method for an optical drive chip to control a light-emitting device, including:

obtaining to-be-sent data by using a receiving unit of the optical drive chip, and transmitting the to-be-sent data to an execution unit of the optical drive chip; and converting, by the execution unit, the to-be-sent data into a drive signal according to a control parameter set, where the drive signal is used to control the light-emitting device to emit visible light, and the control parameter set includes an encoding type and a flash control parameter.

According to a second aspect of this application, this application provides an optical drive chip, including a receiving unit, an execution unit, and a storage unit, where the receiving unit is configured to obtain to-be-sent data;

the execution unit is configured to convert the to-be-sent data into a drive signal according to a control parameter set, where the drive signal is used to control the flash to emit visible light, and the control parameter set includes an encoding type and a flash control parameter; and the encoding storage unit is configured to store an encoding mode corresponding to an encoding type.

BENEFICIAL EFFECTS

This application provides a method for an optical drive chip to control a light-emitting device and an optical drive chip thereof. A receiving unit of the optical drive chip obtains to-be-sent data, and transmits the to-be-sent data to an execution unit of the optical drive chip; and the execution unit converts the to-be-sent data into a drive signal according to a control parameter set, where the drive signal is used to control a light-emitting device to emit visible light. Because the optical drive chip converts the to-be-sent data into the drive signal according to the control parameter set so as to control the light-emitting device, rather than obtaining a single control parameter one by one to control the light-emitting device, no delay problem occurs in a process of controlling the light-emitting device by the optical drive chip. In addition, the to-be-sent data is encoded, which ensures data transmission reliability.

DESCRIPTION OF EMBODIMENTS

Figure 1:
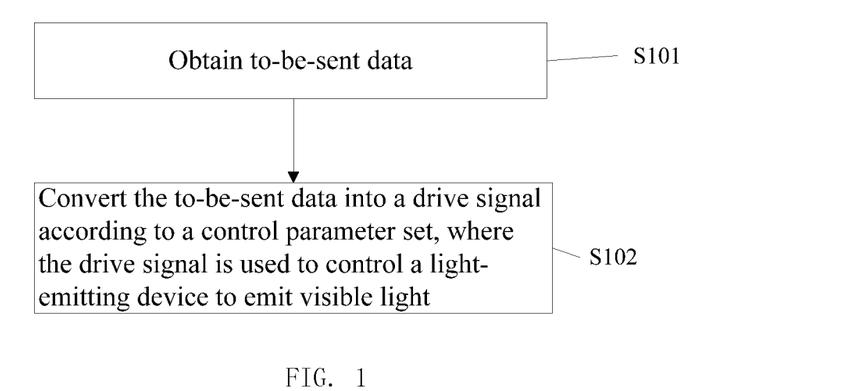
FIG. 1 is a flowchart in which an optical drive chip controls a light-emitting device to emit light according to Embodiment 1.

The present application provides a method for an optical drive chip to control a light-emitting device, including the following steps. Its control flowchart is shown in FIG. 1.

S101. Obtain to-be-sent data.

A receiving unit of an optical drive chip obtains to-be-sent data, and transmits the to-be-sent data to an execution unit of the optical drive chip.

S102. Convert the to-be-sent data into a drive signal according to a control parameter set, where the drive signal is used to control the light-emitting device to emit visible light.

Because the optical drive chip converts the to-be-sent data into the drive signal according to the control parameter set so as to control a flash, rather than obtaining a single control parameter one by one to control the light-emitting device, no delay problem occurs in a process of controlling the light-emitting device by the optical drive chip. In addition, the to-be-sent data is encoded, which ensures data transmission reliability.

A flash is used as an example of the light-emitting device in the present invention, and the following gives further detailed description on the present application with reference to accompanying drawings and specific embodiments.

Embodiment 1

Figure 2:
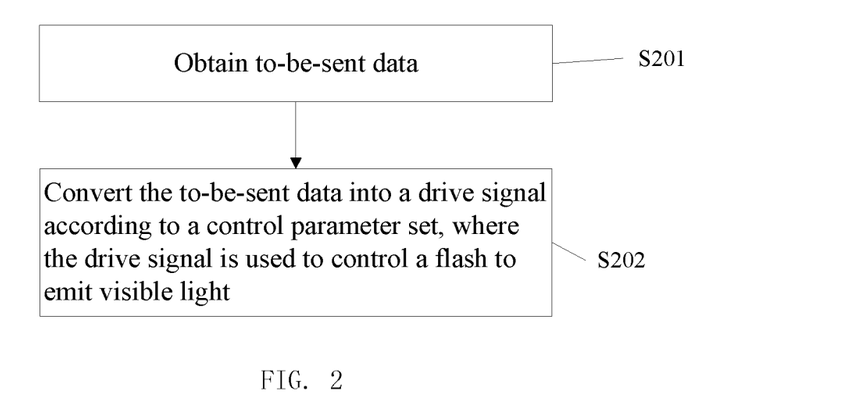
FIG. 2 is a flowchart in which an optical drive chip specifically controls a flash to emit light according to Embodiment 1.

In this embodiment, a method for an optical drive chip to control a light-emitting device according to the present application is applied to flash control. A specific control method includes the following steps. Its control flowchart is shown in FIG. 2.

S201. Obtain to-be-sent data.

A receiving unit of an optical drive chip obtains to-be-sent data, and transmits the to-be-sent data to an execution unit of the optical drive chip.

S202. Convert the to-be-sent data into a drive signal according to a control parameter set, where the drive signal is used to control a flash to emit visible light.

The control parameter set includes an encoding type and flash control parameters. The flash control parameters include: a flash control state, which is used to denote an on or off state of the flash; and flash state duration, which is used to denote on state duration or off state duration of the flash. The flash control parameters may further include light-emitting intensity, a light-emitting phase, light-emitting duration, and/or a light-emitting frequency of the flash.

In this embodiment, the control parameter set may be obtained in two manners.

The first manner is: Parameters in the control parameter set are set dynamically outside. The receiving unit of the optical drive chip further obtains the control parameter set while, before or after obtaining the to-be-sent data, and then the receiving unit transmits the obtained to-be-sent data and control parameter set to the execution unit.

Figure 3:
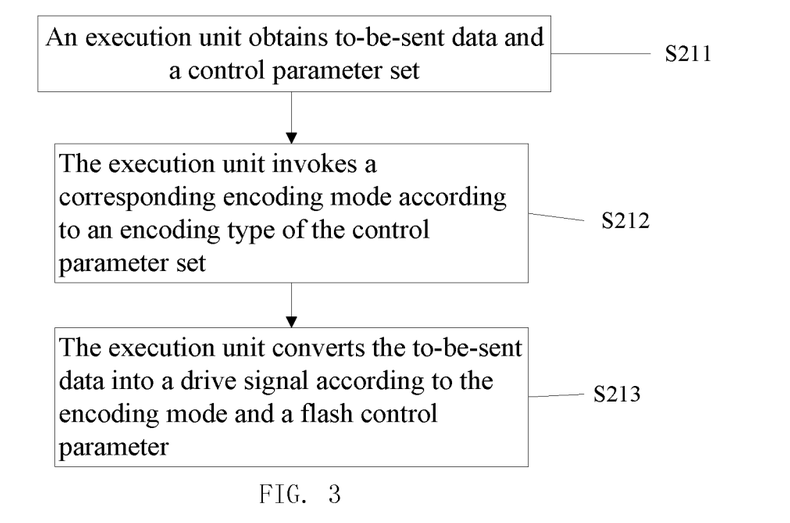
FIG. 3 is a flowchart in which an optical drive chip encodes to-be-sent data by dynamically setting a control parameter set according to Embodiment 1.

For this manner, the steps performed by the execution unit of the optical driving unit to convert the to-be-sent data into a drive signal according to the control parameter set are as follows, and a flowchart of the steps is shown in FIG. 3.

S211. An execution unit obtains to-be-sent data and a control parameter set.

S212. The execution unit invokes a corresponding encoding mode according to the encoding type of the control parameter set.

S213. The execution unit converts the to-be-sent data into the drive signal according to the encoding mode and a flash control parameter.

The second manner is: The parameters in the control parameter set are preset in the execution unit of the optical drive chip, and the parameters in the control parameter set in this manner are set fixedly.

Figure 4:
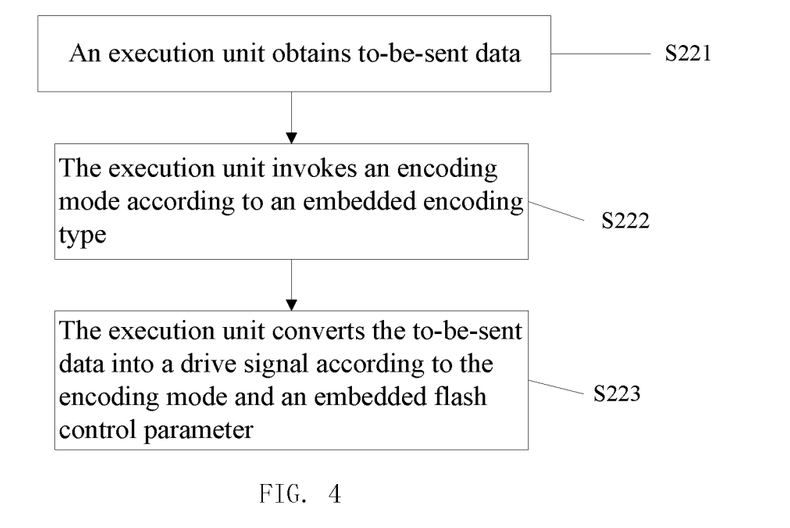
FIG. 4 is a flowchart in which an optical drive chip encodes to-be-sent data by embedding a control parameter set according to Embodiment 1.

For this manner, the steps performed by the execution unit of the optical driving unit to convert the to-be-sent data into a drive signal according to the control parameter set are as follows, and a flowchart of the steps is shown in FIG. 4.

S221. An execution unit obtains to-be-sent data.

S222. The execution unit invokes an encoding mode according to an embedded encoding type.

S223. The execution unit converts the to-be-sent data into the drive signal according to the encoding mode and an embedded flash control parameter.

In other embodiments, the to-be-sent data may be encrypted before the to-be-sent data is encoded. That is, after the execution unit obtains the to-be-sent data, the method further includes: encrypting the to-be-sent data, and then encoding the to-be-sent data according to the encoding type.

In this embodiment, the control parameter set is obtained in the first manner. Specifically, a function interface corresponding to the control parameter set and the to-be-sent data is defined on the receiving unit of the optical drive chip, and the receiving unit obtains the control parameter set and the to-be-sent data by using the function interface. A function body corresponding to the function interface is defined on the execution unit of the optical drive chip. The receiving unit transmits the to-be-sent data and the control parameter set to the function body by using the function interface, and the function body invokes a corresponding encoding mode according to the encoding type, and encodes the to-be-sent data according to the flash control parameter and the encoding mode to obtain the corresponding drive signal. The drive signal controls the flash to emit visible light.

Multiple encoding modes are set in the optical drive chip in this embodiment, for example, an NRZ encoding mode, an NRZI encoding mode, and a Manchester encoding mode. According to the received encoding type, the function body selects a corresponding encoding mode to encode the to-be-sent data.

The NRZ encoding mode, that is a Not Return to Zero encoding mode. When encoding is performed in an NRZ mode, for example, in an code element time in a control source of a binary digit signal, if the binary digit is "1", the LED is controlled to turn on; or, if the binary digit is "0", the LED is controlled to turn off, and in a next code element period, a similar LED lamp control operation is performed. Certainly, a reverse method may be used, that is, in an element time, if the binary digit is "0", the LED is controlled to turn on; or, if the binary digit is "1", the LED is controlled to turn off, and in the next code element period, a similar LED lamp control operation is performed.

The NRZI encoding mode is Non return to zero-inverse encoding mode. When encoding is performed in an NRZI mode, every two bits are a group to denote a total of four types of information 00, 01, 10, and 11. For example, when a group is "00", the information is denoted by one level jump (from a low level to a high level, or from a high level to a low level); when a group is "01", the information is denoted by two level jumps; when a group is "10", the information is denoted by three level jumps; and when a group is "11", the information is denoted by four level jumps. The information may be transmitted in the form of visible light by controlling the on or off state of the LED lamp.

Another encoding mode is a Manchester encoding mode. In the Manchester encoding, a jump exists in the middle of each bit. The jump in the middle of the bit serves as both a clock signal and a data signal. A jump from a high level to a low level denotes "0", and a jump from a high level to a low level denotes "1".

In addition to the foregoing encoding mode, another new encoding mode is provided in this embodiment: an adapted Manchester encoding mode. When the adapted Manchester encoding is applied, each bit is denoted by a digit corresponding to N-ary data, each different digit in the N-ary data is encoded into a different electric signal unit, where high level duration and low level duration in the electric signal unit are $Ti1, Ti2 \ldots, Tij$ respectively, and $Tij$, $i$, $j$, and $N$ are natural numbers. Different electric signal units are separated by delimiters. As regards the high level and the low level in the electric signal unit in this embodiment, a high level does not come before a low level by default. Instead, a low level may come before a high level. A delimiter between a high level and low level may be a level jump; or a high or low level that continues for different duration is used as a characteristic level, and the delimiter between the high level and the low level is a reference level different from the characteristic level.

An operation value between $Ti2, Ti3 \ldots, Tij$ and $Ti1$ is a predetermined value or in a predetermined range, where the operation refers to calculating a ratio, a product, a difference, a sum, a reciprocal, and/or a remainder between the $Ti2, Ti3 \ldots, Tij$ and $Ti1$. Because digits of different N-ary data are encoded into different electric signal units, a different electric unit has a different operation value. That is, a ratio, a product, a difference, a sum, a reciprocal, and/or a remainder between the $Ti2, Ti3 \ldots, Tij$ and $Ti1$ is not equal to a ratio, a product, a difference, a sum, a reciprocal, and/or a remainder between $Ti-12, Ti-13 \ldots, Ti-1j$ and $Ti-11$.

Using the binary data as an example, when N=2, the binary data 0 is encoded into a first electric signal unit, and high and low level duration in the first electric signal unit is T11 and T12 respectively; the binary data 1 is encoded into a second electric signal unit, and high and low level duration in the second electric signal unit is T21 and T22 respectively. T11 duration is a preset time, T12=T11, T21=T11, T22=m*T21, and m is a specified coefficient; or T11 duration is a preset time range, T12, T11, and T21 are in the same time range, T122=m*21, and m is a specified coefficient, which finally makes the operation value between T22 and T21 be unequal to the operation value between T12 and T11.

In an optional embodiment, at least a part of to-be-encoded N-ary data may be encoded into level signals that are in different states, the data is divided into multiple strata according to a size of the level signals, and a different stratum denotes a different digit in the N-ary data.

Figure 5:
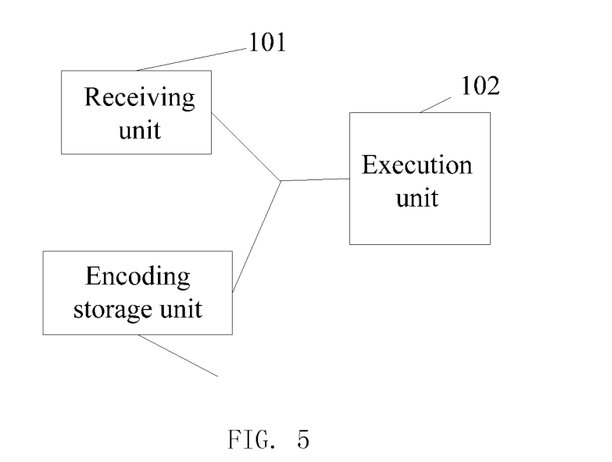
FIG. 5 is a schematic diagram of an optical drive chip according to Embodiment 1.

This embodiment further provides an optical drive chip for implementing the foregoing method. A schematic diagram of the chip is shown in FIG. 5. The optical drive chip includes a receiving unit 101, an execution unit 102, and an encoding storage unit 103. The receiving unit 101 is configured to receive to-be-sent data; the execution unit 102 is configured to convert the to-be-sent data into a drive signal according to a control parameter set, where the drive signal is used to control the flash to emit visible light, and the control parameter set includes an encoding type and a flash control parameter; and the encoding storage unit 103 is configured to store an encoding mode corresponding to an encoding type.

The control parameter set is obtained in the first manner, that is, parameters in the control parameter set are set dynamically outside. The receiving unit of the optical drive chip further obtains the control parameter set while obtaining the to-be-sent data, and then the receiving unit transmits the obtained to-be-sent data and control parameter set to the execution unit. Because the parameters in the control parameter set are set dynamically outside, the encoding type may be: NRZ encoding, NRZI encoding, Manchester encoding, or adapted Manchester encoding. Accordingly, the encoding storage unit 103 pre-stores the corresponding encoding mode.

Figure 6:
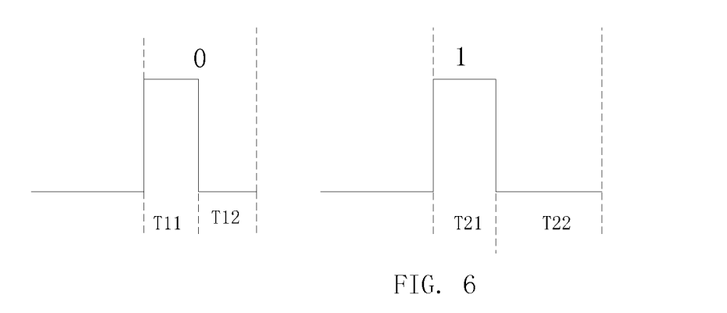
FIG. 6 is a waveform diagram of electric signal units that represent binary data 0 and 1 in an adapted Manchester encoding mode in an optical drive chip according to Embodiment 1.
Figure 7:
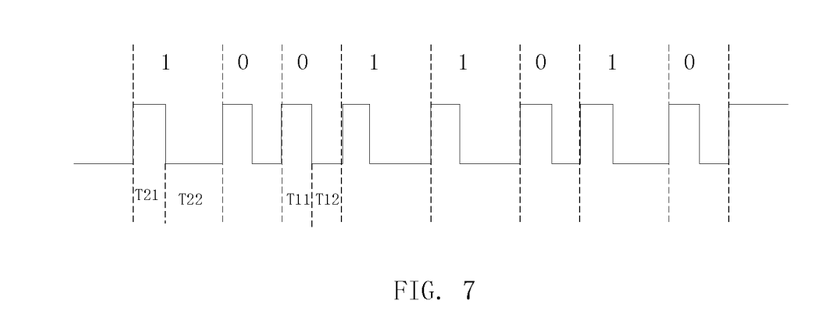
FIG. 7 is a waveform diagram of electric signals of information encoded in an adapted Manchester encoding mode in an optical drive chip according to Embodiment 1.

The following describes a specific application in which an optical drive chip controls a flash according to this embodiment. For example, the receiving unit 101 receives to-be-sent data and a flash control parameter set that are sent by the outside. Binary data of the to-be-sent data is 10011010, and the control parameter set is: the encoding type is adapted Manchester encoding; and the preset duration T11 is 5 ms, T12=T11, T21=T11, and T22=2*T21. The binary data 10011010 is encoded according to the foregoing encoding method, and the encoding mode corresponding to 0 or 1 is: when information 1 is read, the information is converted into an electric signal unit, and duration of a high level in the electric signal unit is 5 ms, and then the level jumps from the high level to a low level, duration of the low level is 10 ms, and a waveform of the electric signal unit of the low level is shown in FIG. 6; when information 0 is read, the information is converted into an electric signal unit, and duration of a high level in the electric signal unit is 5 ms, and then the level jumps from the high level to a low level, duration of the low level is 5 ms, and a waveform of the electric signal unit of the low level is shown in FIG. 6. This process goes on by analogy. Then all electric signal units are combined, and the electric signal units are separated by delimiters, and the delimiters are level jumps. Finally, the binary data is an electric signal corresponding to 10011010, as shown in FIG. 7. The electric signal controls the LED flash of the mobile terminal to flash, and the encoded information is sent in the form of visible light.

In another optional embodiment, it may be preset that a time range T11 is 4 ms-6 ms, T12=T11, T21=T11, and T22=2*T21. The binary data 10011010 is encoded according to the foregoing encoding method, and the encoding mode corresponding to 0 or 1 is: when information 1 is read, the information is converted into an electric signal unit, which is specifically: a continuation time range of a high level in the electric signal unit is 4 ms-6 ms, and then the level jumps from the high level to a low level, a continuation time range of the low level is 8 ms-12 ms; when information 0 is read, the information is converted into an electric signal unit, which is specifically: a continuation time range of a high level in the electric signal unit is 4 ms-6 ms, and then the level jumps from the high level to a low level, a continuation time range of the low level is 4 ms-6 ms. This process goes on by analogy. Then all electric signal units are combined, and the electric signal units are separated by delimiters, and the delimiters are level jumps. Finally, the binary data is an electric signal corresponding to 10011010.

The electric signal controls the LED flash of the mobile terminal to flash, and the encoded information is sent in the form of visible light.

Figure 8:
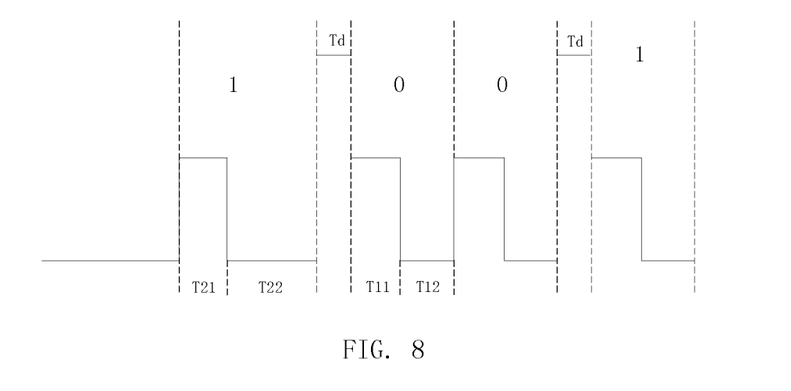
FIG. 8 is another waveform diagram of electric signals of information encoded in an adapted Manchester encoding mode in an optical drive chip according to Embodiment 1.

In another optional embodiment, all electric signal units may be separated by using a reference level as a delimiter. According to actual conditions, a reference level different from the characteristic level is selected. In this embodiment, a double high level is used as a reference level. In other embodiments, a high level of other multiples may be used as a reference level. Binary data is used as an example. For example, a to-be-sent data is converted into binary data 1001. The binary data 1001 is encoded according to the foregoing method. Different electric signal units are separated by using a high level as a delimiter, and the duration Td of the high level is less than high and low level duration in each electric signal unit. Finally the binary data is the electric signal corresponding to 1001, as shown in FIG. 8.

Embodiment 2

Embodiment 1 provides a method for an optical drive chip to control a flash, and this embodiment describes an application of the optical drive chip in a flash of a mobile terminal.

The mobile terminal may be a mobile phone or a tablet or the like. The application of the optical drive chip in a mobile phone flash is as an example. The mobile phone is based on an Android system, and the architecture and components of the Android system are well-known to a person skilled in the art, and are not described herein any further. The optical drive chip is a bottom-layer part of the mobile phone, and is used to control actions of the mobile phone flash.

Figure 9:
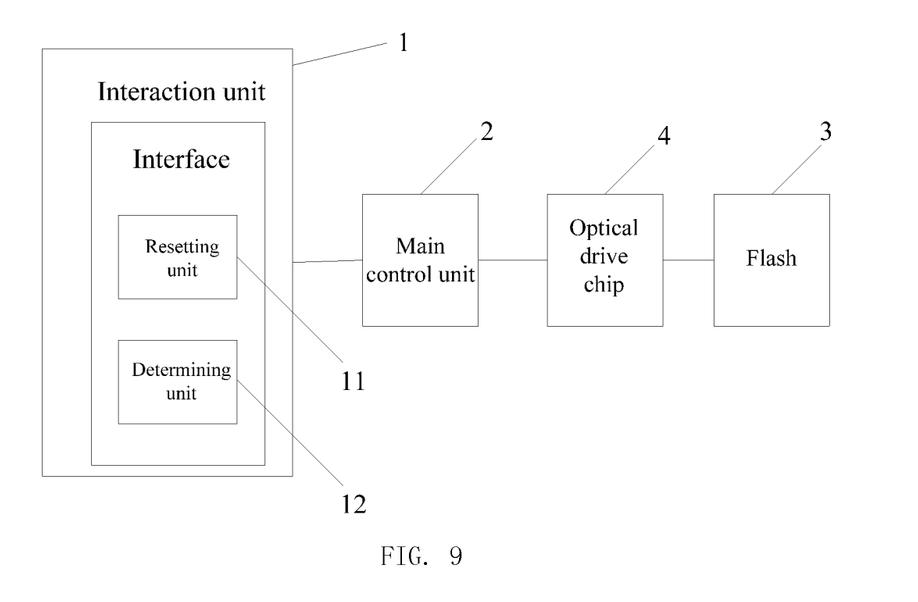
FIG. 9 is a schematic diagram of applying an optical drive chip to a mobile terminal according to Embodiment 2.

A schematic diagram of applying the optical drive chip in a mobile phone is shown in FIG. 9. The mobile phone includes an interaction unit 1, a main control unit 2, a flash 3, and an optical drive chip 4.

The interaction unit 1 is connected to an input end of the main control unit 2 in a communicational manner, an output end of the main control unit 2 is connected to an input end of the optical drive chip 4 in a communicational manner, and an output end of the optical drive chip 4 is connected to the flash 3 in a communicational manner. The interaction unit 1 is configured to obtain to-be-sent data and a control parameter set of the flash, and transmit the to-be-sent data and the control parameter set to the main control unit 2. The main control unit 2 is configured to transmit the to-be-sent data and the control parameter set to the optical drive chip 4. The optical drive chip 4 is configured to encode the to-be-sent data into a drive signal according to the control parameter set, where the drive signal controls the flash 3 to emit visible light. The flash 3 may be an LED or a laser lamp, and is LED in this embodiment. Principles and a structure of the optical drive chip 4 are similar to those of the optical drive chip in Embodiment 1, and are not detailed herein any further.

Further, the interaction unit 1 has an interface for a user to input the control parameter set. The interface includes a resetting unit 11 and a determining unit 12. The resetting unit 11 is configured for the user to input the to-be-sent data again and set the control parameter set. The determining unit 12 is configured for the user to determine the input data.

Steps performed by the optical drive chip 4 to control the mobile phone flash are as follows:

1) The interaction unit 1 obtains to-be-sent data and a control parameter set of the flash, and sends the to-be-sent data and the control parameter set to the main control unit 2.

The control parameter set includes an encoding type and flash control parameters. The flash control parameters include: a flash control state, which is used to denote an on or off state of the flash; and flash state duration, which is used to denote on state duration or off state duration of the flash. The flash control parameters may further include light-emitting intensity, a light-emitting phase, light-emitting duration, and/or a light-emitting frequency of the flash.

2) The main control unit 2 sends the to-be-sent data and the control parameter set to the receiving unit of the optical drive chip 4.

A function interface is defined on the receiving unit, and the function interface is configured to receive the to-be-sent data and the control parameter set.

3) The execution unit of the optical drive chip 4 encodes the to-be-sent data into a drive signal according to the control parameter set, where the drive signal controls the flash to emit visible light.

Specifically, a function body is defined on the execution unit, and the function body invokes a corresponding encoding mode according to the encoding type of the control parameter set, and converts the to-be-sent data into a drive signal according to the encoding type and the flash control parameter set, where the drive signal is used to control the flash to emit visible light.

The purpose of controlling the flash can be fulfilled by performing steps 1)~3). Because control parameters received by the receiving unit of the optical drive chip 4 are in the form of a set rather than control parameters received one by one, no delay problem occurs in the process of controlling the flash by the optical drive chip 4.

A person skilled in the art may understand that all or a part of the steps of methods in the foregoing embodiments may be implemented by a program instructing relevant hardware. The program may be stored in a computer readable storage medium, where the storage medium may include a read-only memory, a random access memory, a magnetic disk, or an optical disc or the like.

The foregoing content is detailed description that is made about the present application with reference to specific implementation manners, but specific implementation of the present application shall not be limited to such description. A person of ordinary skill in the art may simply obtain derivatives or replacements without departing from the conception of the present invention.

INDUSTRIAL APPLICABILITY

The technical solution provided in the present application resolves the delay problem that occurs when a mobile terminal controls a flash, and is industrially producible and manufacturable, and is industrially applicable.

What is claimed is:

1. A method for an optical drive chip to control a light-emitting device, which is applied in optical drive chip, the optical drive chip has a main processor and a storage medium, and the main processor is used for executing the function of a receiving unit and an execution unit stored in the storage medium, the method comprising:

obtaining, by a receiving unit of the optical drive chip, to-be-sent data, and transmitting the to-be-sent data to an execution unit of the optical drive chip; and converting, by the execution unit, the to-be-sent data into a drive signal according to a control parameter set, the drive signal is used to control the light-emitting device to emit visible light, and the control parameter set comprises an encoding type and a light-emitting device control parameter, a function interface corresponding to the control parameter set and the to-be-sent data is defined on the receiving unit, and the receiving unit obtains the control parameter set and the to-be-sent data by using the function interface; a function body corresponding to the function interface is defined on the execution unit; the receiving unit transmits the to-be-sent data and the control parameter set to the function body by using the function interface, and the function body invokes a corresponding encoding mode according to the encoding type, and encodes the to-be-sent data according to the light-emitting device control parameter and the encoding mode to obtain the corresponding drive signal; the drive signal controls light-emitting device to emit visible light;

the encoding type comprises an adapted Manchester encoding mode, when the adapted Manchester encoding is applied, each bit is denoted by a digit corresponding to N-ary data, each different digit in the N-ary data is encoded into a different electric signal unit, where high level duration and low level duration in the electric signal unit are Ti1, Ti2 . . . , Tij respectively, and Tij, i, j, and N are natural numbers, different electric signal units are separated by delimiters.

2. The method according to claim 1, wherein a parameter in the control parameter set is dynamically set, and the receiving unit further obtains the control parameter set while, before or after obtaining the to-be-sent data.

3. The method according to claim 2, wherein the converting, by the execution unit, the to-be-sent data into a drive signal according to a control parameter set comprises:
obtaining, by the execution unit, the to-be-sent data and the control parameter set;
invoking, by the execution unit, a corresponding encoding mode according to the encoding type of the control parameter set; and
converting, by the execution unit, the to-be-sent data into the drive signal according to the encoding mode and a flash control parameter.

4. The method according to claim 1, wherein a parameter in the control parameter set is preset in the execution unit of the optical drive chip.

5. The method according to claim 2, wherein the light-emitting device control parameter comprises:
a light-emitting device control state, which is used to denote an on or off state of the light-emitting device.

6. The method according to claim 5, wherein the light-emitting device control parameter further comprises light-emitting device state duration; and
the light-emitting device state duration is used to denote on state duration or off state duration of the light-emitting device, and the duration is correlated with the to-be-sent data.

7. The method according to claim 6, wherein the light-emitting device control parameter further comprises light-emitting intensity, light-emitting duration, a light-emitting frequency, and/or a light-emitting phase of the light-emitting device.

8. The method according to claim 4, wherein the converting, by the execution unit, the to-be-sent data into a drive signal according to a control parameter set comprises:
obtaining, by the execution unit, the to-be-sent data;
invoking, by the execution unit, an encoding mode according to an embedded encoding type; and
converting, by the execution unit, the to-be-sent data into the drive signal according to the encoding mode and the embedded light-emitting device control parameter.

9. The method according to claim 8, wherein after the execution unit obtains the to-be-sent data, the method further comprises: encrypting the to-be-sent data.

10. The method according to claim 1, wherein the light-emitting device is a flash.

11. An optical drive chip, comprising: a main processor and a storage medium, and the main processor is used for executing the following program unit stored in the storage medium, a receiving unit, an encoding storage unit, and an execution unit, wherein
the receiving unit is configured to obtain to-be-sent data;
the execution unit is configured to convert the to-be-sent data into a drive signal according to a control parameter set, the drive signal is used to control the light-emitting device to emit visible light, and the control parameter set comprises an encoding type and a light-emitting device control parameter,
a function interface corresponding to the control parameter set and the to-be-sent data is defined on the receiving unit, and the receiving unit obtains the control parameter set and the to-be-sent data by using the function interface; a function body corresponding to the function interface is defined on the execution unit; the receiving unit transmits the to-be-sent data and the control parameter set to the function body by using the function interface, and the function body invokes a corresponding encoding mode according to the encoding type, and encodes the to-be-sent data according to the light-emitting device control parameter and the encoding mode to obtain the corresponding drive signal; the drive signal controls light-emitting device to emit visible light;
the encoding storage unit is configured to store an encoding mode corresponding to the encoding type; and
the encoding type comprises an adapted Manchester encoding mode, when the adapted Manchester encoding is applied, each bit is denoted by a digit corresponding to N-ary data, each different digit in the N-ary data is encoded into a different electric signal unit, where high level duration and low level duration in the electric signal unit are Ti1, Ti2 . . . , Tij respectively, and Tij, i, j, and N are natural numbers, different electric signal units are separated by delimiters.

12. The optical drive chip according to claim 11, wherein a parameter in the control parameter set is preset in the execution unit.

13. The optical drive chip according to claim 11, wherein a parameter in the control parameter set is dynamically set, and the receiving unit is further configured to obtain the control parameter set while, before or after obtaining the to-be-sent data.

14. The optical drive chip according to claim 13, wherein the light-emitting device control parameter comprises:
a light-emitting device control state, which is used to denote an on or off state of the light-emitting device.

15. The optical drive chip according to claim 14, wherein the light-emitting device control parameter further comprises light-emitting device state duration; and
the light-emitting device state duration is used to denote on state duration or off state duration of the light-emitting device, and the duration is correlated with the to-be-sent data.

16. The optical drive chip according to claim 15, wherein the light-emitting device control parameter further comprises light-emitting intensity, light-emitting duration, a light-emitting frequency, and/or a light-emitting phase of the light-emitting device.

17. The optical drive chip according to claim 13, wherein the encoding mode is an NRZ encoding mode, an NRZI encoding mode, a Manchester encoding mode, or an adapted Manchester encoding mode.

* * * * *